(12) United States Patent
Antanies

(10) Patent No.: US 8,195,426 B1
(45) Date of Patent: Jun. 5, 2012

(54) DATA ANALYSIS SYSTEMS AND RELATED METHODS

(76) Inventor: John Antanies, Phoenix, AZ (US)

( * ) Notice: Subject to any disclaimer, the term of this patent is extended or adjusted under 35 U.S.C. 154(b) by 705 days.

(21) Appl. No.: 12/255,467

(22) Filed: Oct. 21, 2008

Related U.S. Application Data

(63) Continuation-in-part of application No. 11/691,871, filed on Mar. 27, 2007, now Pat. No. 7,555,405, which is a continuation-in-part of application No. 10/954,082, filed on Sep. 30, 2004, now Pat. No. 7,283,928.

(51) Int. Cl.
*G06F 17/18* (2006.01)

(52) U.S. Cl. ............ 702/179; 702/75; 702/79; 702/80; 702/82; 702/83; 702/90; 702/128; 702/146; 702/147; 702/176; 702/177; 702/178; 702/180; 702/181; 702/182; 702/183; 703/1; 700/108; 600/302; 600/345

(58) Field of Classification Search .................... 702/75, 702/79, 80, 82, 83, 90, 128, 146, 147, 176–183; 707/1; 700/108; 600/302, 345
See application file for complete search history.

(56) References Cited

U.S. PATENT DOCUMENTS

| | | | |
|---|---|---|---|
| 5,546,516 A | 8/1996 | Austel et al. | |
| 5,694,524 A | 12/1997 | Evans | |
| 5,850,339 A | 12/1998 | Giles | |
| 6,098,063 A | 8/2000 | Xie et al. | |
| 6,110,109 A | 8/2000 | Hu et al. | |
| 6,507,832 B1 | 1/2003 | Evans et al. | |
| 6,539,392 B1 * | 3/2003 | Rebane | 705/7.31 |
| 6,687,558 B2 | 2/2004 | Tuszynski | |
| 2001/0041995 A1 | 11/2001 | Eder | |
| 2002/0091609 A1 | 7/2002 | Markowski | |
| 2002/0103688 A1 | 8/2002 | Schneider | |
| 2002/0152148 A1 | 10/2002 | Ebert | |
| 2003/0004903 A1 | 1/2003 | Kehder et al. | |
| 2003/0050048 A1 | 3/2003 | Abed et al. | |
| 2003/0050814 A1 | 3/2003 | Stoneking et al. | |
| 2004/0064353 A1 | 4/2004 | Kim et al. | |
| 2004/0122860 A1 | 6/2004 | Srinivasan | |

* cited by examiner

*Primary Examiner* — Sujoy Kundu
(74) *Attorney, Agent, or Firm* — Booth Udall, PLC

(57) ABSTRACT

Data analysis systems and related methods. An implementation of a method of determining a relationship between a variable of interest and one or more process variables represented by a corresponding plurality of tags may include accessing a data historian including historical data including a variable of interest and a plurality of tags. The method may include defining a plurality of bins, retrieving historical data corresponding with the plurality of bins using the data historian, filtering the historical data for each of the plurality of bins using one or more filters to produce filtered historical data, generating an output display using the filtered historical data for the variable of interest and each of the plurality of tags, and determining which of the plurality of tags correlate with the variable of interest using the output display. The output display may include an overlay CUSUM chart and a correlation plot.

20 Claims, 17 Drawing Sheets

DATA ANALYSIS SYSTEMS AND RELATED METHODS

CROSS REFERENCE TO RELATED APPLICATIONS

This application is a continuation-in-part application of the earlier U.S. Utility Patent Application to John Antanies entitled "Computerized Method for Creating a Cusum Chart for Data Analysis," application Ser. No. 11/691,871, filed Mar. 27, 2007, now pending, which is a continuation-in-part application of the earlier U.S. Utility Patent Application to John Antanies entitled "Computerized Method and Software for Data Analysis," application Ser. No. 10/954,082, filed Sep. 30, 2004, now U.S. Pat. No. 7,283,928, issued Oct. 16, 2007, the disclosures of which are hereby incorporated entirely herein by reference.

BACKGROUND

1. Technical Field

Aspects of this document relate generally to computer analysis systems and methods used for analyzing data from an industrial, manufacturing, or business processes.

2. Background Art

Data analysis systems are conventionally utilized in combination with many industrial and commercial processes to collect and process information coming from the process. Data analysis systems conventionally receive sensor data, equipment performance information, product property information, and other information about the process that may be useful if stored. Determining what data and which variables measured in the process affect process output are common uses for conventional data analysis systems.

SUMMARY

Implementations of data analysis systems may utilize implementations of a method of determining a relationship between a variable of interest and one or more process variables represented by a corresponding plurality of tags. A first implementation of the method may include accessing a data historian including historical data from a process, the data historian including a variable of interest and a plurality of tags. The method may further include defining a plurality of bins, retrieving historical data corresponding with the plurality of bins using the data historian, and filtering the historical data for each of the plurality of bins using one or more filters to produce filtered historical data. The method may also include generating an output display using the filtered historical data for the variable of interest and each of the plurality of tags. The output display may include an overlay CUSUM chart and a correlation plot. The method may include determining which of the plurality of tags correlate with the variable of interest using the output display.

A second implementation of a method of determining a relationship between a variable of interest and one or more process variables represented by a corresponding plurality of tags may include accessing a data historian including historical data from a process, the historical data including a variable of interest and a plurality of tags. The method may include defining a plurality of bins, retrieving historical data corresponding with the plurality of bins using the data historian, filtering the historical data for each of the plurality of bins using one or more filters to produce filtered historical data, and calculating one or more distribution breakpoints for each of the plurality of tags. The method may also include calculating quartile data for each of the plurality of tags from the filtered historical data using the one or more distribution breakpoints, comparing the quartile data for each of the plurality of tags with quartile data generated using a Monte Carlo random number simulation, and determining a probability that the quartile data for each of the plurality of tags exhibits controlled behavior. The method may include returning each tag having quartile data with a probability above a predetermined threshold that the tag exhibits controlled behavior and generating an output display using the filtered historical data for each returned tag. The output display may include an overlay CUSUM chart, a correlation plot, and a quartile plot. The method may also include determining for each tag whether the tag corresponds with the variable of interest using the output display.

First and second implementations of a method of determining a relationship between a variable of interest and one or more process variables represented by a corresponding plurality of tags may include one, all, or some of the following:

The method may further include determining one or more inflection points for the overlay CUSUM chart.

A third implementation of a method of determining a relationship between a variable of interest and one or more process variables represented by a corresponding plurality of tags may include accessing a data historian including historical data from a process, the historical data including a variable of interest and a plurality of tags. The method may also include defining a plurality of bins, retrieving historical data corresponding with the plurality of bins using the data historian, filtering the historical data for each of the plurality of bins using one or more filters to produce filtered historical data, and calculating one or more distribution breakpoints for each of the plurality of tags. The method may include calculating quartile data for each of the plurality of tags from the filtered historical data using the one or more distribution breakpoints, comparing the quartile data for each of the plurality of tags with quartile data generated using a Monte Carlo random number simulation, and determining a probability that the quartile data for each of the plurality of tags exhibits controlled behavior. The method may also include returning each tag having quartile data with a probability above a predetermined threshold that the tag exhibits controlled behavior, calculating a set of CUSUM data for each of the returned tags, and determining one or more inflection points for each calculated set of CUSUM data. The method may include calculating a correlation statistic using the filtered historical data for the variable of interest and each returned tag, and determining for each tag whether the tag corresponds with the variable of interest.

Implementations of a method of determining a relationship between a variable of interest and one or more process variables represented by a corresponding plurality of tags may include one, all, or some of the following:

Filtering the historical data for each of the plurality of bins may further include using one or more filters for values of the variable of interest that utilize one of duration, frequency, value, date, vendor, and trial to select historical data from each of the plurality of bins.

Determining which of the plurality of tags correlate with the variable of interest using the output display or determining for each tag whether the tag corresponds with the variable of interest using the output display may include:

Comparing a shape of a CUSUM line for each of the plurality of tags with a shape of a CUSUM line for the variable of interest on each overlay CUSUM chart or comparing the set of CUSUM data for each of the plurality of tags with the set of CUSUM data for the variable of interest and determining a correlation.

Comparing one or more inflection points for the CUSUM line for the variable of interest stored in a table with one or more inflection points for the CUSUM line of each of the plurality of tags stored in a table or comparing one or more inflection points for the set of CUSUM data for the variable of interest with one or more inflection points for the set of CUSUM data for each of the plurality of tags and determining a correlation.

Comparing an $R^2$ value on the correlation plot with a predetermined threshold or comparing an $R^2$ value with a predetermined threshold and determining a correlation.

Determining a correlation using a correlation statistic on the correlation plot or using the calculated correlation statistic.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1A:
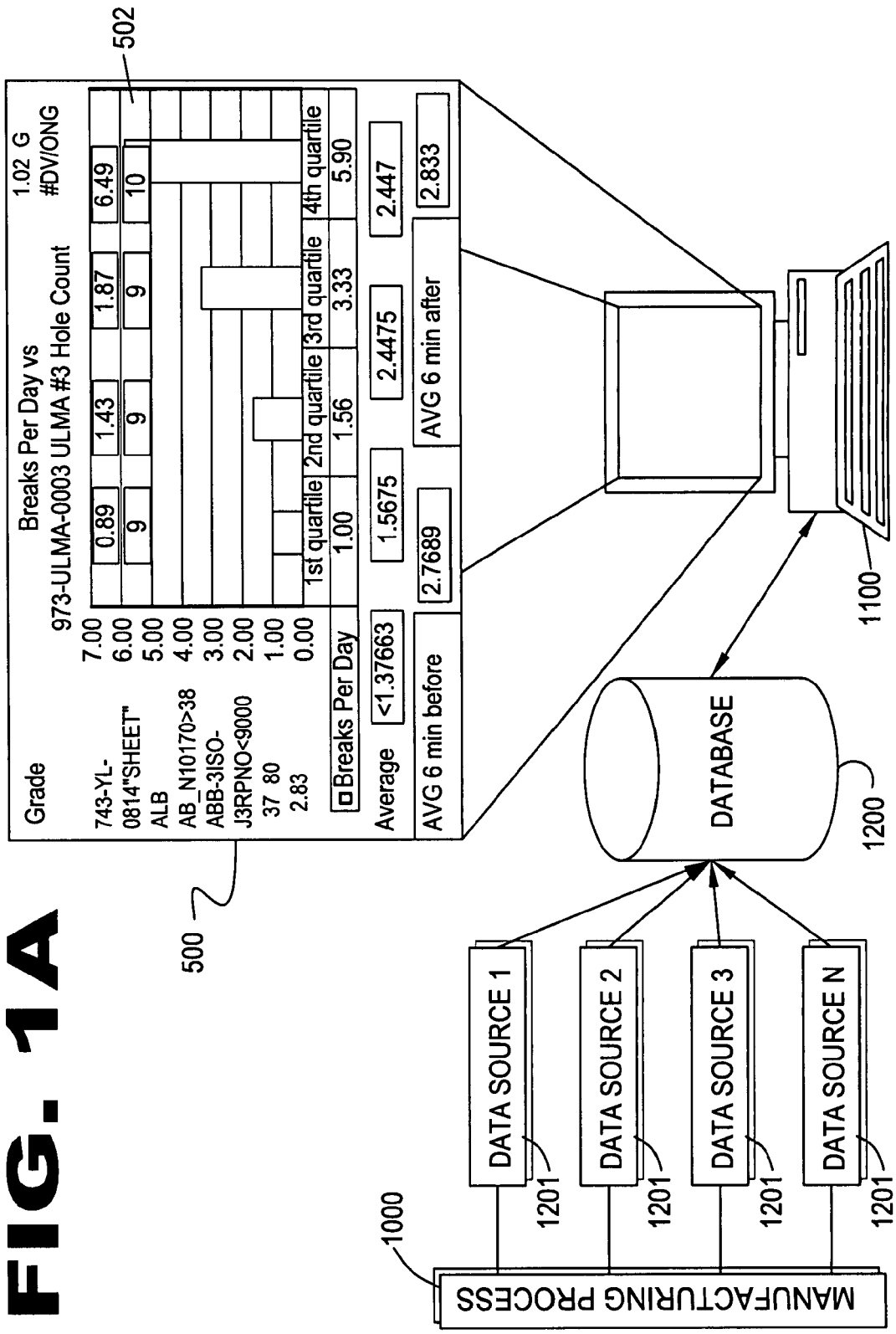
FIG. 1A is a block diagram of an implementation of computer system employing a computer program to perform a computerized method for data analysis.

Implementations of computerized method and software for data analysis provide a computerized method for identifying a causal relationship between at least one independent variable and a dependent variable in a set of data representing historical operating parameters of an industrial process, and software for carrying out the method. Referring to FIG. 1A, the computerized method and software for data analysis is executed on a computer 1100, such as a typical personal computer or the like. The computer 1100 accesses data from a database 1200, including data obtained from at least one data source 1201 in communication with an industrial or manufacturing process 1000. Various methods of automating manufacturing equipment, and recording historical data derived from a manufacturing process 1000, are well known to those skilled in the art. Database 1200 thus contains a set of data representing historical operating parameters of an industrial process. Note that the database 1200 may be maintained within the computer 1100, or may be a separately maintained database, such as a database server accessed on a computer network.

The computerized method for data analysis involves inputting selected data from the database 1200 into the computer 1100. The selected data is organized into sample sets, such as all data samples collected in a single day. The selected data includes, within each sample set, at least one independent variable and one dependent variable, wherein the dependent variable is typically chosen to represent a fault condition, or a quality measure, production rate, speed, etc., within the manufacturing process 1000.

The sample sets are arranged, according to an independent variable, into distribution sets. In the illustrated implementation, the distribution sets are quartile sets, although the present invention is not limited to quartile distribution sets. The distribution sets are used to generate a graph displayed on the computer 1100 that relates independent variable data to the dependent variable, illustrating a correlation between the independent and dependent variables to aid in determining a cause and effect relationship.

Figure 1B:
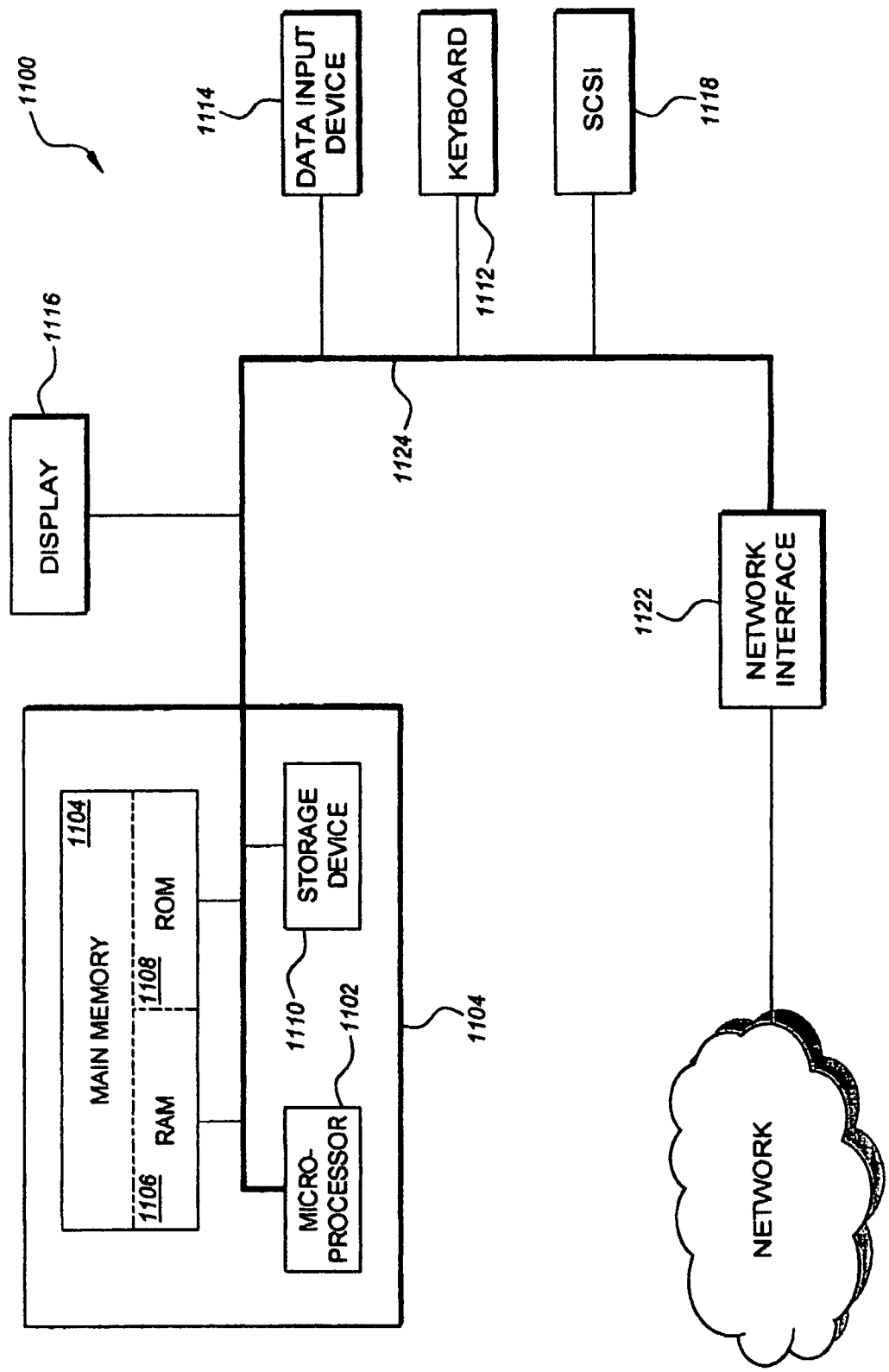
FIG. 1B is a block diagram of a computer system in which software for data analysis operates according to the computerized method for data analysis.

The computerized method and software for data analysis comprises a computerized method for data analysis implemented by software executing on a computer 1100. Referring to FIG. 1B, the computer 1100 is a general purpose or personal computer of a generally known and common configuration. Such a computer has a microprocessor 1102 connected by a bus 1124 to an area of main memory 1104, comprising both read only memory (ROM) 1108, and random access memory (RAM) 1106, and a storage device 1110 having means for reading a coded set of program instructions on a computer readable medium which may be loaded into main memory 1104 and executed by the microprocessor 1102. The computer 1100 has a display device 1116, a keyboard 1112, and may include other input devices 1114 such as automating devices in communication with the manufacturing process 1000, a mouse, joystick, etc. A network communication interface 1122 is provided for serial communications on a network or other serial communications link. Additionally, the computer 1100 may include a Small Computer System Interface (SCSI) adapter 1118 for communication with peripheral devices, including data sources 1201 such as automating devices in communication with the manufacturing process 1000.

Figure 2A:
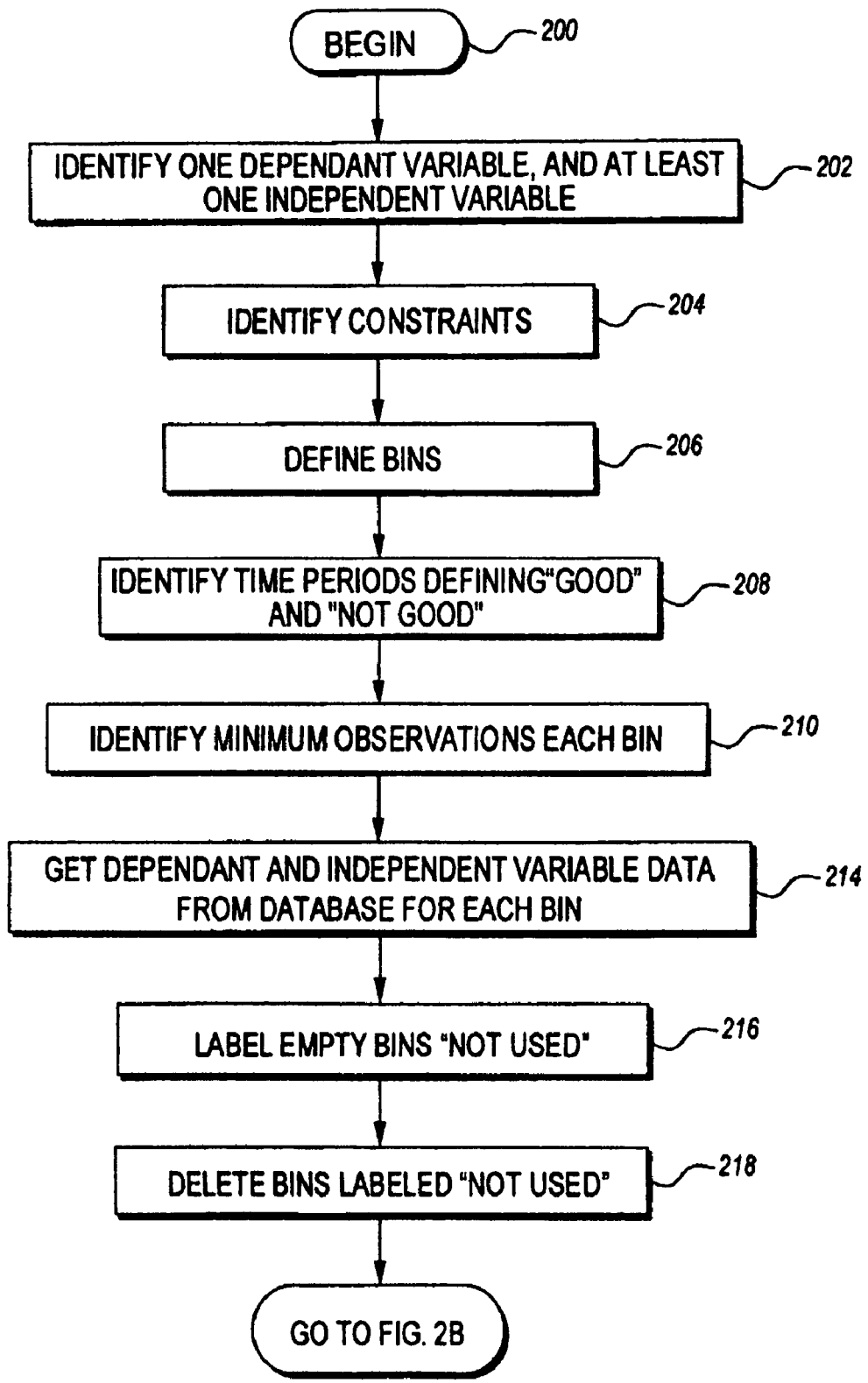
FIGS. 2A and 2B are a flow charts that illustrated implementations of a computerized method for data analysis.
Figure 2B:
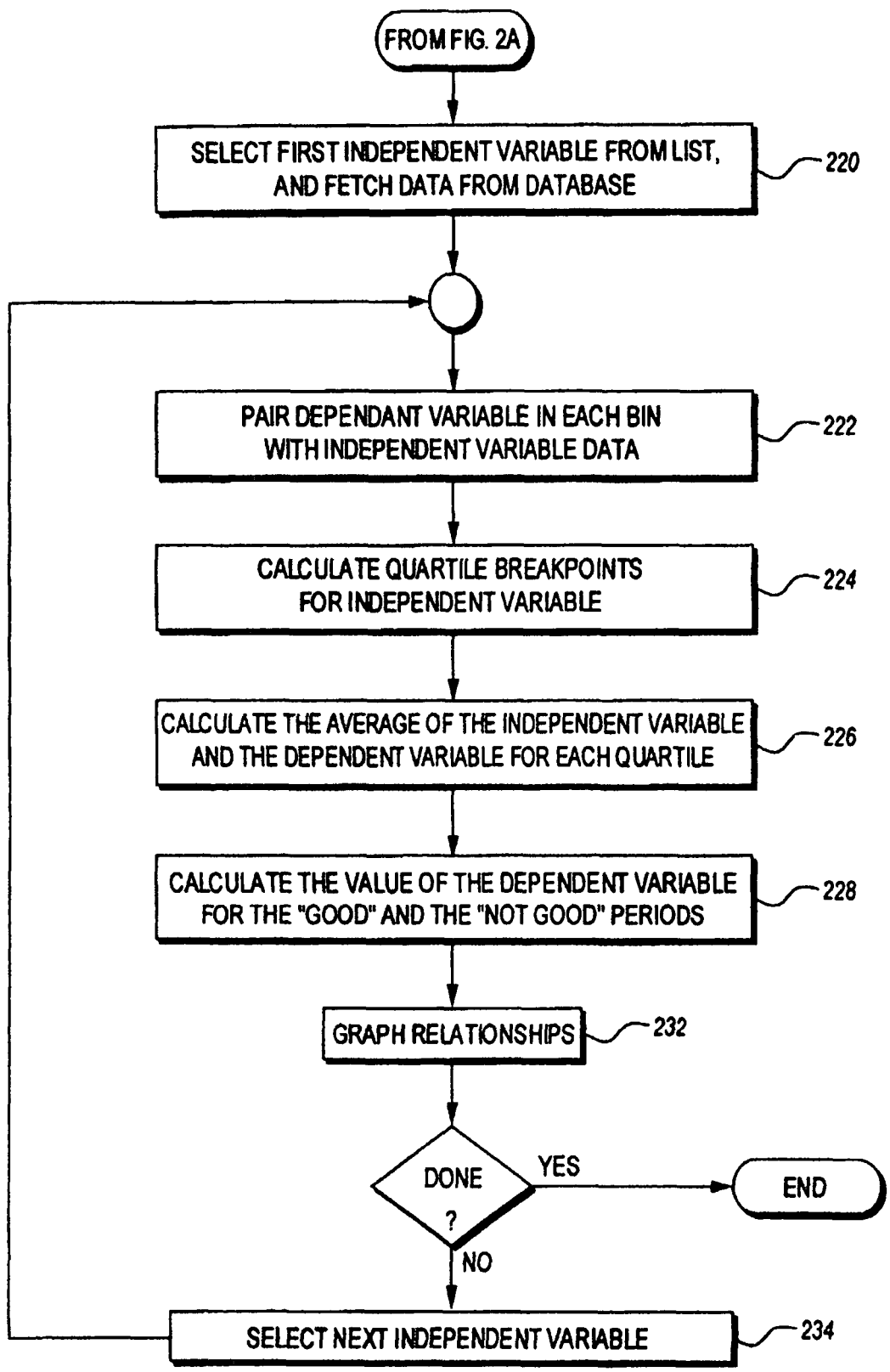
Figure 3A:
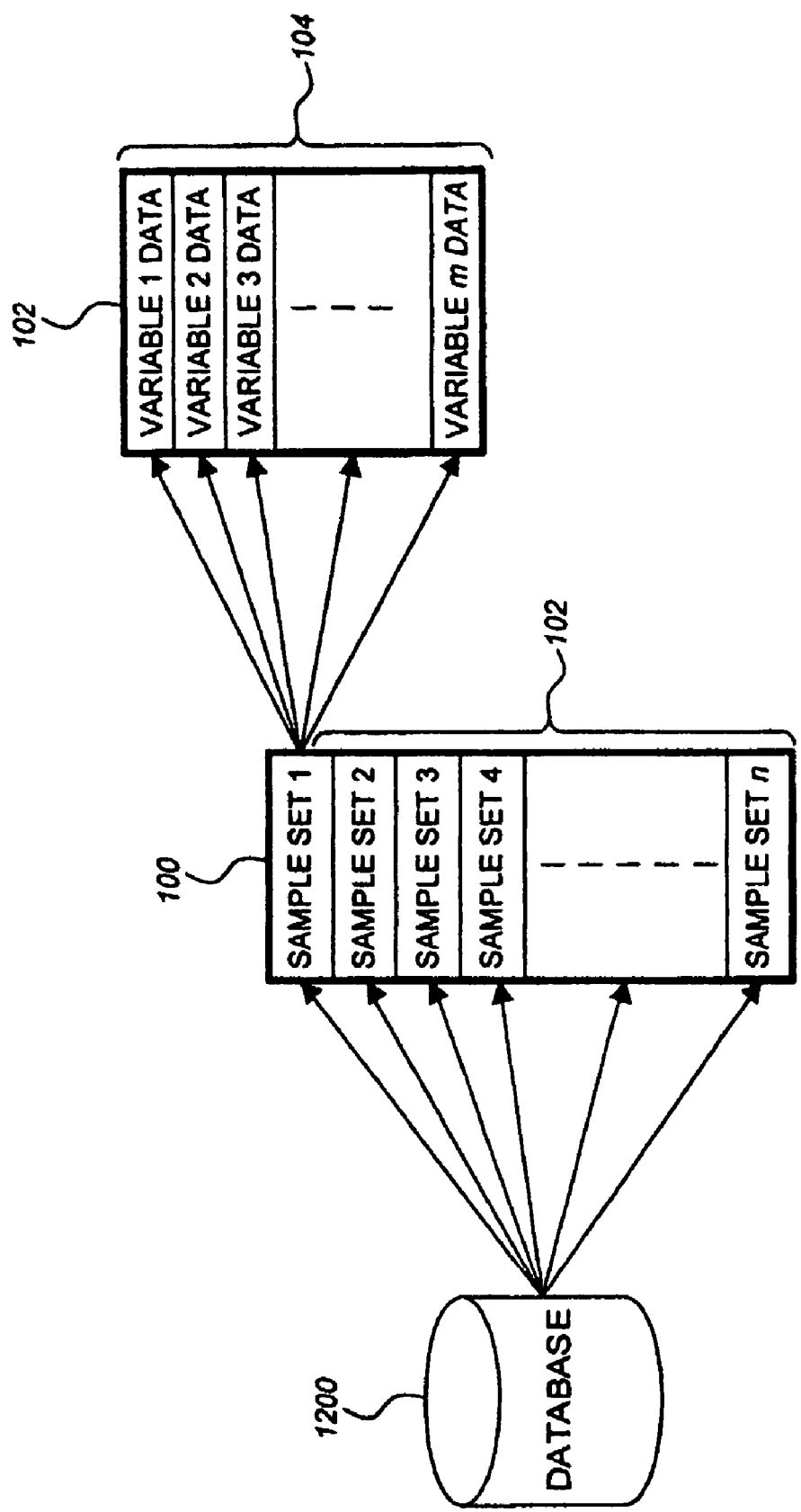
FIGS. 3A, 3B and 3C are block diagrams depicting a data transformation from raw historical data to filtered data organized into bins for analysis.
Figure 3B:
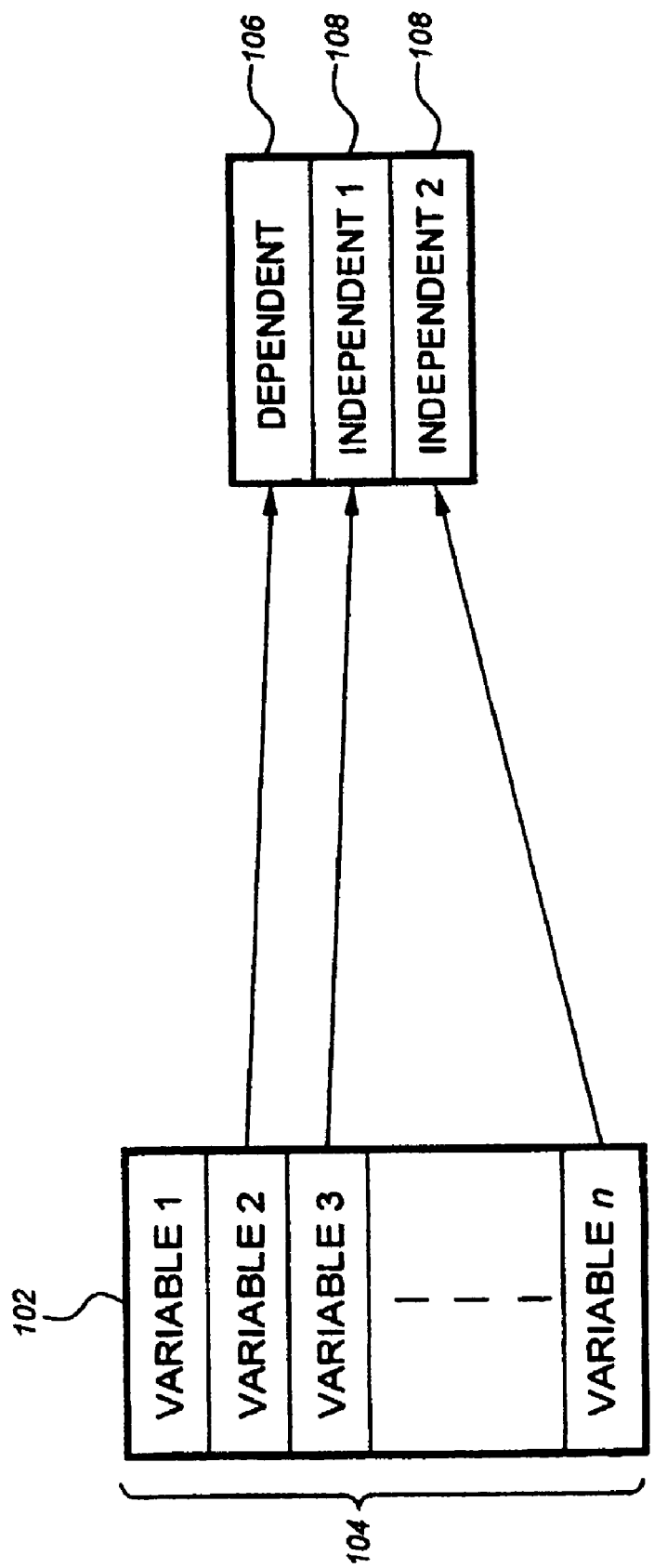
Figure 3C:
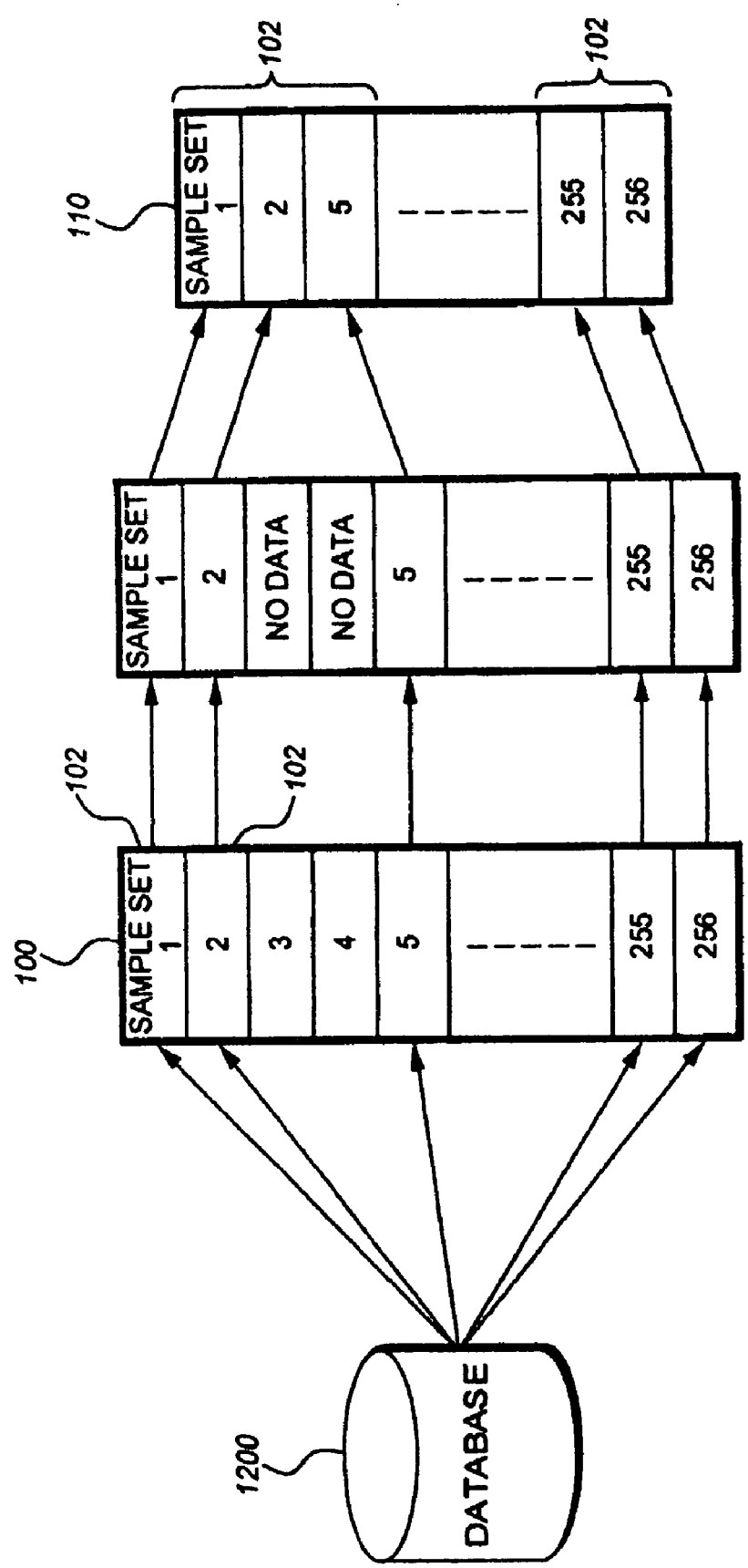

Turning now to FIGS. 2A and 2B, a flowchart illustrates the computerized method for data analysis is described in greater detail. Referring particularly to FIG. 2A along with FIGS. 3A, 3B, and 3C, the process begins, at step 200, with a series of steps wherein a user enters information relating generally to identifying the data to be analyzed, and the data is retrieved accordingly from the database 1200. The database 1200 contains data samples for a number of variables spanning a statistically useful historical time period. For the purposes of analysis, the data samples are organized into a raw collection 100 of sample sets or "bins" 102, each bin 102 being a uniform portion of the historical time period, such as a day or an hour. Within each bin 102 are data samples for several of the data variables 104. One of the data variables is designated as the dependent variable 106 (step 202), the dependent variable generally being a variable related to a particular fault condition, or a quality measure, production rate, speed, etc., within the manufacturing process 1000. At least one of the variables is designated as an independent variable 108. Constraints are identified for the dependent variable 106 and the independent variable 108, such as minimum or maximum values, or a range of data considered useful or desirable for a particular analysis (step 204).

Bins 102 are defined by setting the size and number of the bins desired for analysis. For example, each bin 102 might be defined to contain a day's worth of data samples, and two hundred and fifty six (256) bins 102 might be used (step 206). Also, a minimum number of samples may be specified for the bins 102. In addition to the bins 102, a time period may be identified to define a period of "good" process performance versus a period of "bad" process performance (step 208).

Once the bins 102 have been defined, data for the dependent variable 102 and the independent variable(s) are retrieved from the database for each of the bins 102 (step 214), according to the constraints that were defined by the user. Note that the dependent variable 106 might be represented within a bin 102 as a single data value (such as the count of an event occurring within the time frame of a bin 102), or as a number of data samples (such as a periodic sampling of a parameter within the time frame of a bin 102). If the dependent variable 106 is represented as a number of data samples, the average value for the number of data samples within a bin 102 is determined, along with a coefficient of variation, and recorded as the dependent variable value. As a result of the data constraints applied to the data retrieved from the database 1200, some of the bins 102 may have no data. Bins 102 with no data, or bins 102 that contain less than a specified minimum number of samples, are marked (step 216) and deleted (step 218). As an alternative, in addition to deleting the bins 102 that have been marked, new bins 102 may be identified within the database 1200 to replace the deleted bins, maintaining the desired number of bins 102. The result is a cleaned collection 110 of bins 102 that contain valid and relevant data for the dependent variable 106 and the independent variables 108.

Figure 4:
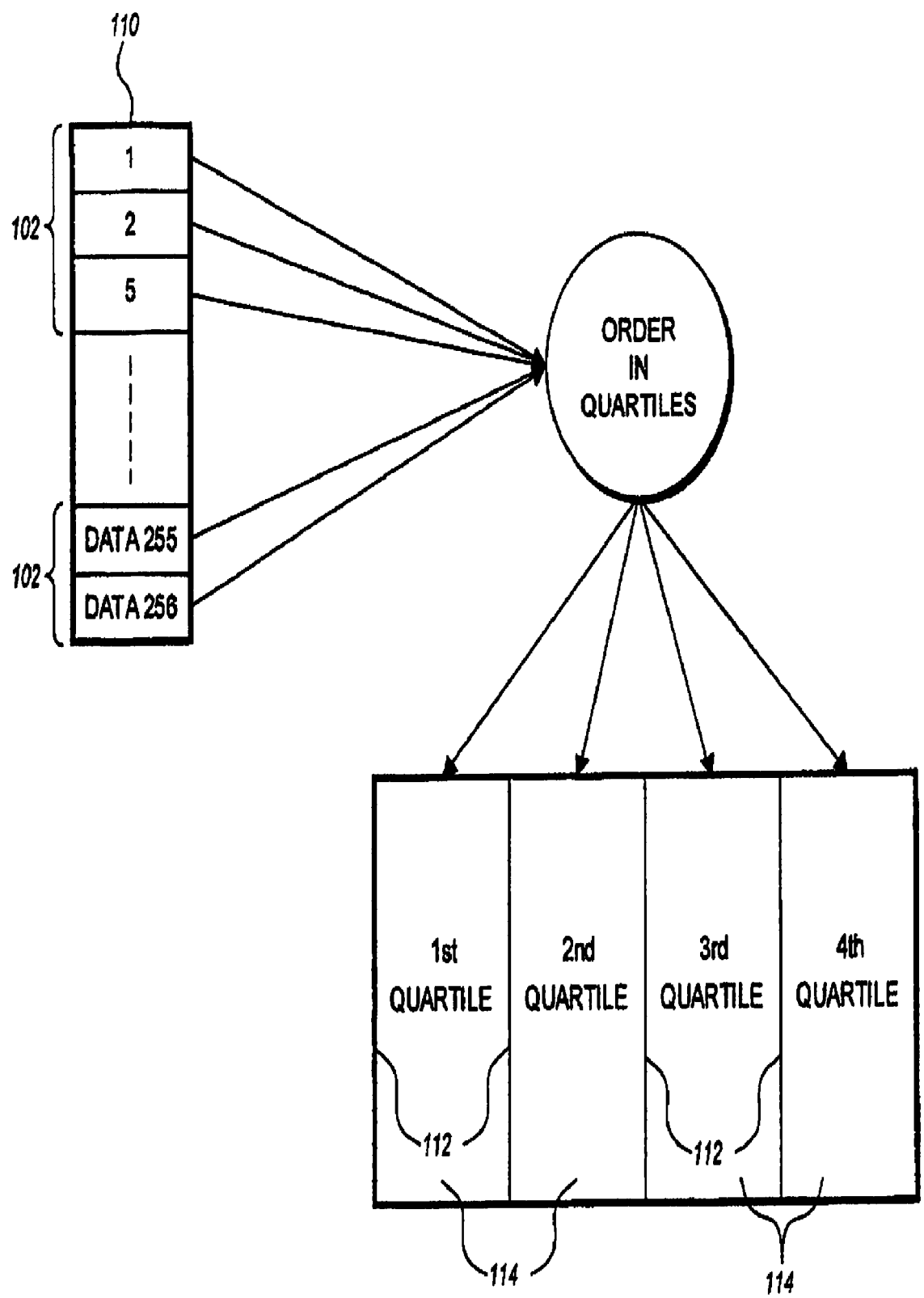
FIG. 4 is a block diagram depicting a data transformation from historical data organized in bins into a quartile distribution of the data.

Turning now to FIG. 2B, along with FIG. 4, the bins 102 are ranked according to an independent variable 108, and separated into a plurality of distribution sets 114, and a graph is produced to visually relate the dependent variable data to the independent variable data. The bins 102 may be ranked by the average value of the independent variable 108 within each bin, or by the coefficient of variation of the independent variable 108 data within the bins, or both. In the implementation illustrated, the distribution sets 114 consist of four (4) quartile sets. This is repeated for each independent variable 108.

At step 220, a first independent variable is selected from a list of the independent variables identified previously at step 202. The bins 102 are then ordered into an ascending (or descending) series according to the independent variable data (step 222), using the average value or the coefficient of variation for each bin 102. The independent variable data is then used to calculate breakpoints 112 that divide the series of bins 102 into a plurality of distribution sets 114 (step 224). The distribution sets 114 may be determined to contain approximately the same number of bins 102, or may be determined by another criteria, such as a weighted distribution of the independent variable data. For each of the distribution sets 114, the average value of the independent variable 108 and the average value of the dependent variable 106 are determined (step 226). Additionally, a coefficient of variation may be determined for the independent variable 108 and for the dependent variable 106.

In addition to the distribution sets 114, data values or averages may be determined for the "good" and "not good" periods defined previously (step 228).

Figure 5:
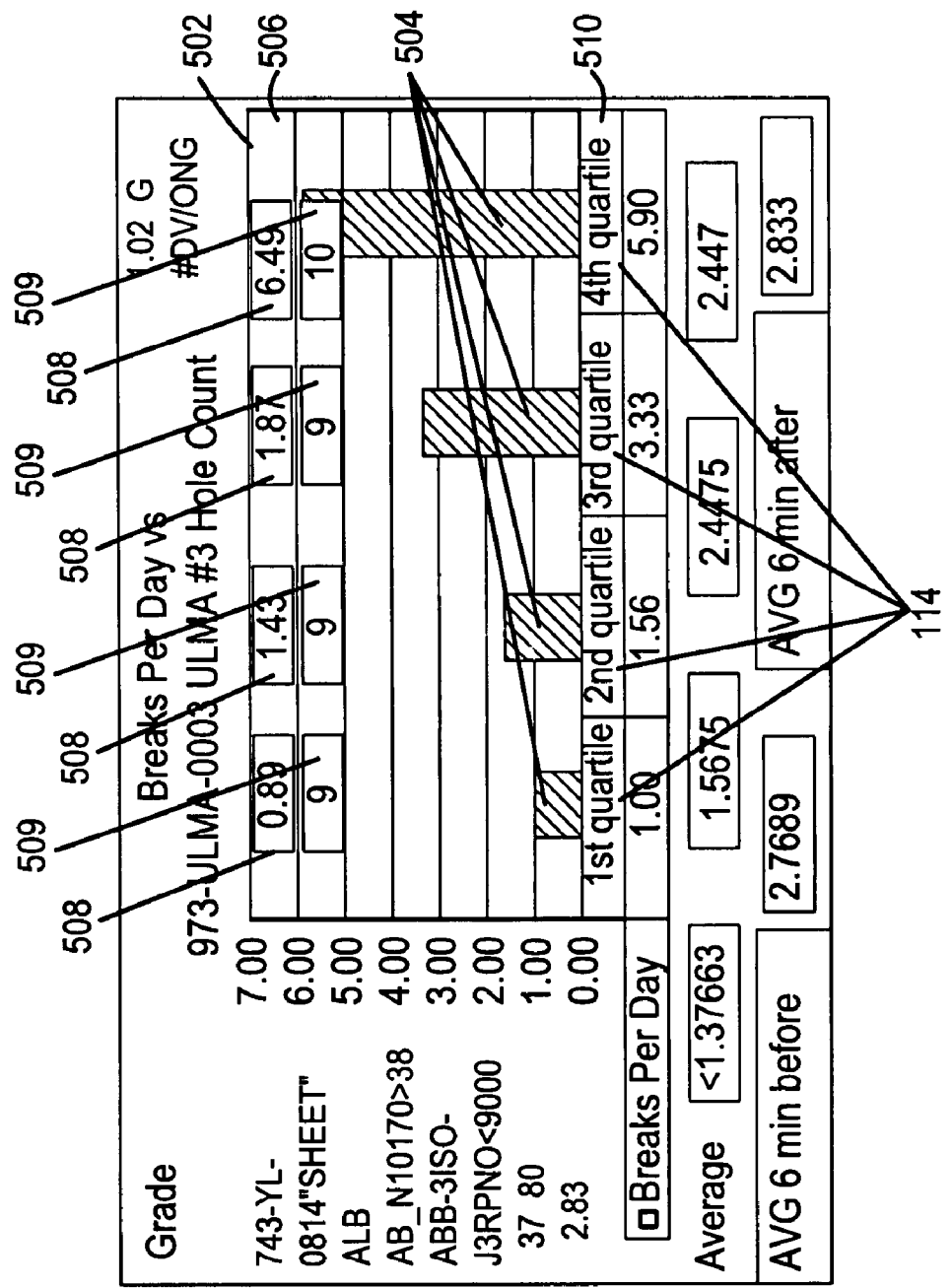
FIG. 5 is a screen shot illustrating a quartile distribution of an independent variable and its mapping to dependent variable data.

A graph is generated to visually associate the independent variable 108 and the dependent variable 106 average values. Referring to FIG. 5, a display image 500 is shown including a bar graph 502. The bar graph 502 includes a vertical bar 504 for each of the distribution sets 114, the vertical extent of each bar 504 indicating the average value for the dependent variable 106 within the associated distribution set 114. Along the top of the bar graph 502, an independent variable legend 506 displays the independent variable average value 508 for each of the distribution sets 114. A bin count legend 509 displays the number of bins 102 within each of the distribution sets 114. Note that a graph may be derived from either the average value or the coefficient of variation of the independent variable within each bin 102.

If additional independent variables 108 were identified, the next independent variable is selected (step 234) and the process repeated from step 222.

The bar graph 502 depicted in FIG. 5 shows a number of breaks per day in a paper manufacturing process verses a hole count, wherein breaks per day refers to breaks in the paper product web, while the hole count is a count of holes in the paper product web at a particular point in the paper manufacturing process. It can be recognized, by inspection of the bar graph 502, that there is a correlation between the breaks per day and the hole count. A fourth quartile 510 distribution set 114, which contains the highest independent variable values, also indicates the highest number of breaks per day.

Figure 6:
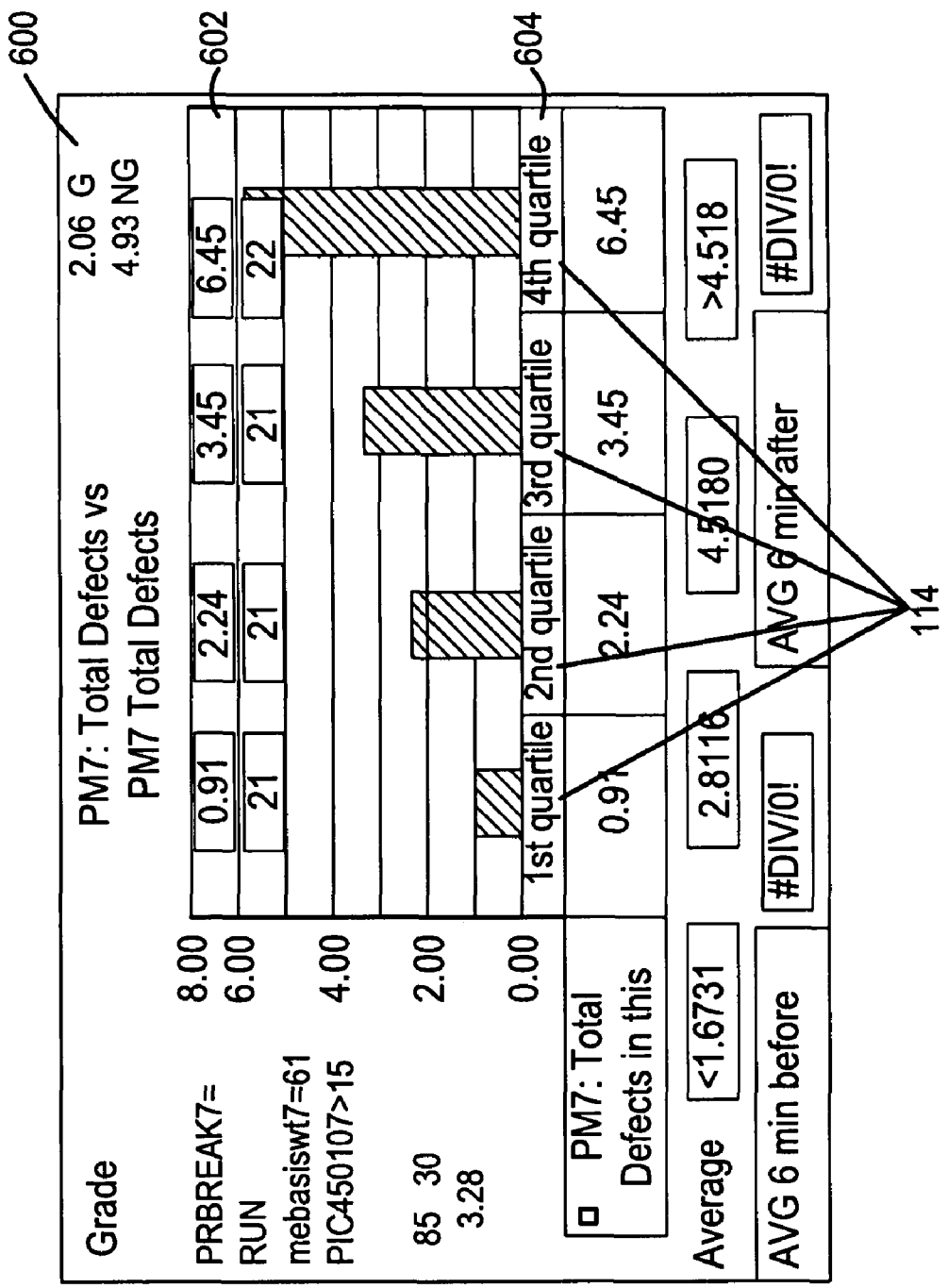
FIG. 6 is a screen shot illustrating the comparison of a dependent variable to itself to obtain a quartile distribution of the dependent variable.

Turning now to FIG. 6, a special case is illustrated wherein the same variable is selected as both the dependent variable 106 and the independent variable 108. The resulting display image 600 includes a bar graph 602 that depicts a distribution of the dependent variable across the quartile distribution sets 114. The bar graph 602 depicted in FIG. 6 ranks the variable "Total Defects" into quartile distribution sets 114. It is worth noting that this distribution identifies the "worst case" 604 among the distribution sets 114 for the dependent variable 106. Thus, it is useful to know that no other independent variable 108 can have a single distribution set 114 with a greater dependent variable 106 average value, unless the distribution set 114 based on a different independent variable 108 contains fewer bins 102.

It can be recognized that, once distribution sets 114 are determined for a given independent variable 108 and a given set of defined constraints, the distribution sets 114 and their associated average and coefficient of variation values for the independent variable do not change for subsequent analyzes utilizing different dependant variables 106, except for generally trivial changes that may result if, for example, pairings of independent variable 108 and dependent variable 106 samples result in slightly different distribution set 114 breakpoints. This allows for the comparison of multiple graphs, based on several dependent variables 106 each graphed against the same independent variable 108 distribution sets 114, to reveal causal relationships among the variables rather than a mere correlation.

Figure 7:
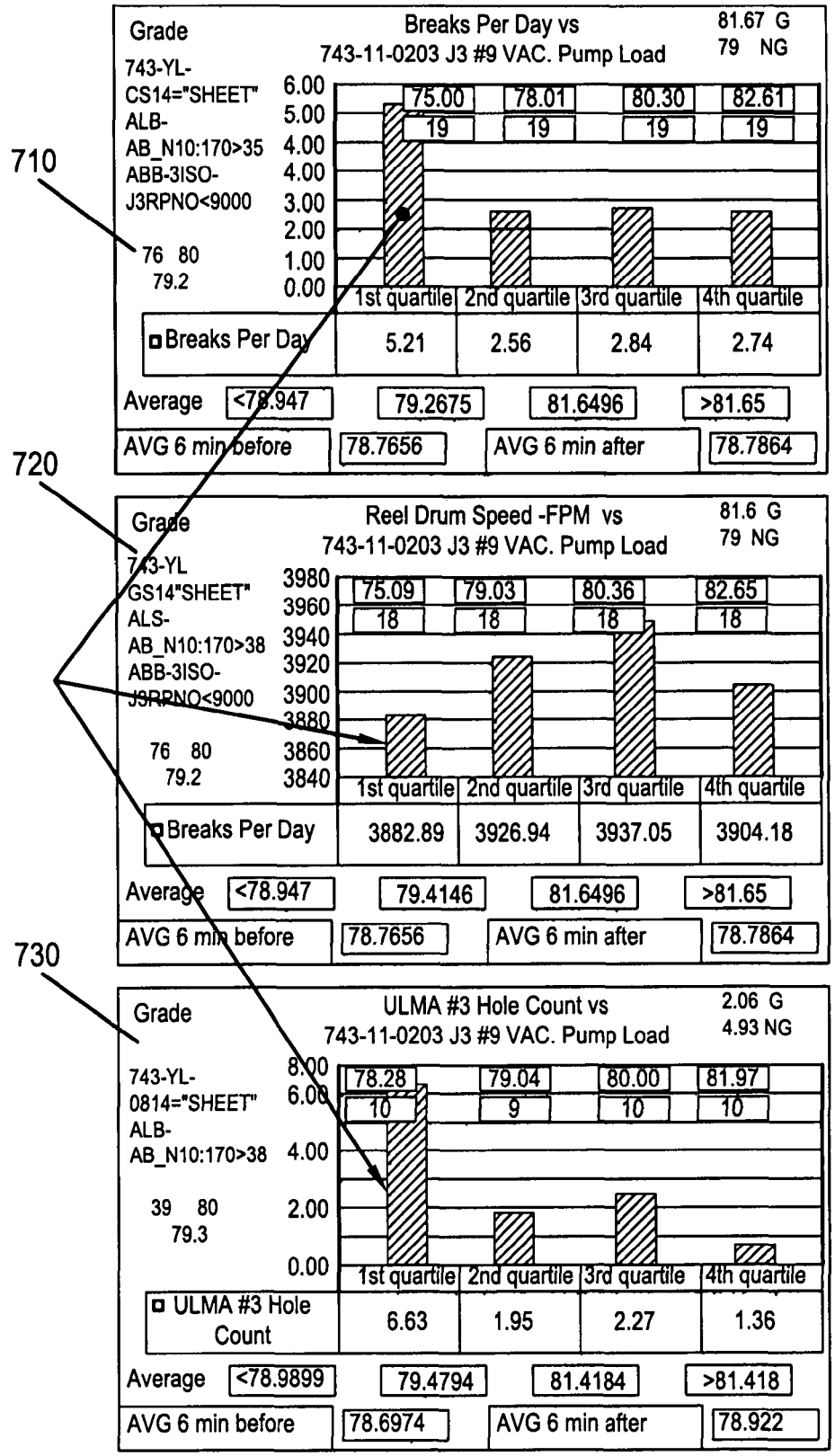
FIG. 7 illustrates the graphical relationship between multiple analyses showing a correlation between a dependent variable and at least one independent variable.

Turning to FIG. 7, it is shown that the computerized method for data analysis provides great insight into cause and effect relationships when multiple graphs are produced to discover relationships between multiple dependent variable 106 and independent variable 108 parings. In the example illustrated in FIG. 7, a paper manufacturing process for producing a manufactured paper web is analyzed to determine a cause of excessive paper breaks within the process in a day. Data collected from the paper manufacturing process includes the number of paper breaks per day, a measured vacuum pump load, a reel drum speed, and a count of holes found in the manufactured paper web (hole count). In each of three analyses, the measured vacuum pump load ("#9 VAC. PUMP LOAD") is used as the independent variable 108. In a first analysis, wherein the computerized method for data analysis results in graph 710, the number of paper breaks per day ("Breaks Per Day") is chosen as the dependent variable 106. The resulting graph 710 reveals that the breaks per day are correlated with a low vacuum pump load.

Additionally, in a second analysis, wherein the computerized method for data analysis results in graph 720, the reel drum speed ("Reel Drum Speed-FPM") is chosen as the dependent variable 106. The resulting graph 720 reveals that the real drum speed is also correlated with a low vacuum pump load. Finally, in a third analysis, wherein the computerized method for data analysis results in bar graph 730, the hole count ("#3 Hole Count") is chosen as the dependent variable 106. The resulting bar graph 730 reveals that the hole count too is correlated with a low vacuum pump load.

It follows that, while a comparison of breaks per day against reel drum speed and against hole count may indicate a correlation, the presentation of multiple analyses, effectively holding constant the independent variable across each analyses, reveals with a significant degree of confidence an actual causation of the paper breaks. More particularly, in this example, one proceeds to calculate the speed for the low vacuum pump load because paper breaks might have been caused by high speed; "freezing" the quartiles tells those skilled in the art that, in fact, the speed was the lowest in this quartile. Thus, high speed is not causing the breaks.

This method of "freezing the quartiles" also effectively identifies how human and control policies corrupt historical data. For example, if slow speed is associated with high break counts, it could be due to operators slowing down when they have problems. The fact that "slowing down" does not "fix" the problem tells one that taking action is not a "lever" with which to control breaks.

Additional graph types can be utilized as part of the analysis process as aids in identifying variables that impact a particular variable of interest, such as breaks per day. These graphs may be constructed using historical data from a process obtained by and stored in a data historian. Using historical data from a data historian coupled with a process, stored historical data may be obtained using the data historian that includes a variable of interest and one or more other process variables or "tags." In particular implementations of data analysis systems, a set of bins may be defined which may be used to retrieve stored historical data that matches criteria corresponding with the particular bin (such as, for example, historical data collected on a particular day). One or more filters may be employed in particular implementations to retrieve filtered historical data from the bins that corresponds with any of a wide variety of filter criteria, such as, by non-limiting example, duration, frequency, value, date, vendor, and trial, and any other variable or parameter that can be used to differentiate data values. Relevant teachings regarding data historians, bins, and filters can be found in the U.S. Utility patent application to John Antanies entitled "Computerized Method for Creating a Cusum Chart for Data Analysis," application Ser. No. 11/691,871, filed Mar. 27, 2007, the contents of which were previously incorporated by reference. Data historians may include any of a wide variety of database types and formats, such as, by non-limiting example, the PI System™ marketed by OSIsoft®, IP.21 marketed by AspenTech®, a flat file database, a non-relational database, a text file, a relational database, or any other system and/or format capable of storing historical data.

An example of such a graph is a CUSUM chart. CUSUM stands for "cumulative sum" and provides a way to develop a control chart where each point on the chart depends in part upon the value of the previous point. Conventional Shewhart control charts consist of plotted points where the location of each point does not involve any calculation involving any previously plotted points. Because of this, Shewhart control charts generally lack the ability to quickly detect shifts in the process mean less than 1.5 standard deviations in size. CUSUM charts, on the other hand, are capable of signaling sooner than Shewhart charts when process shifts in this range occur. A CUSUM chart is a plot of the cumulative sum of deviations of process values from a target or historical mean value. Equation 1 illustrates the general formula for calculating each point on a CUSUM chart:

$$C_i = \Sigma_{j=1}^{i}(\bar{x}_j - \mu_0) \tag{1}$$

Where $C_i$ is the ith point on the CUSUM chart, j is the number of samples, $\bar{x}_j$ is the average of each of the individual values within a single sample (or the individual value of the sample if only one measurement is taken), and $\mu_0$ is a target value for the variable being plotted on the chart (or a historical average value of that variable). As a practical matter, Equation 1 can be simplified into a formula that yields the value of each point on the CUSUM chart as a function of the point immediately before it $(C_{i-1})$:

$$C_i = (\bar{x}_i - \mu_0) + C_{i-1} \tag{2}$$

When only individual data points are used for each sample, a CUSUM chart can be constructed by subtracting the target value from the ith data point and adding the result to the value of the last point on the chart. Because the deviation between the current point and the target is added to the value of the last point the chart, a shift in the process mean quickly manifests itself as a steadily rising or falling trend on a CUSUM chart (depending upon whether the shift was upward or downward from the target value). The point or set of points on the CUSUM chart at which the rising or falling trend begins can be referred to as an inflection point. Because the date of the data point corresponding with the inflection point represents a "turn on" date for a process shift, valuable information can be obtained by evaluating what other process variables (sometimes represented within the data set by corresponding "tags") shifted close to the same time. While in certain implementations of data analysis systems and related methods disclosed in this document, CUSUM charts can be monitored using control limits like conventional Shewhart control charts (often using a tabular CUSUM chart or a V-mask), the CUSUM charts in many other implementations will most often be used to identify inflection points, or turn-on dates, for shifts in particular variables. Additional information regarding the structure, use, and function of CUSUM control charts may be found in *Introduction to Statistical Quality Control*, Douglas C. Montgomery, 4th Edition, Chap. 8 (John Wiley and Sons, 2001), the relevant disclosure of which is incorporated herein by reference.

Figure 8:
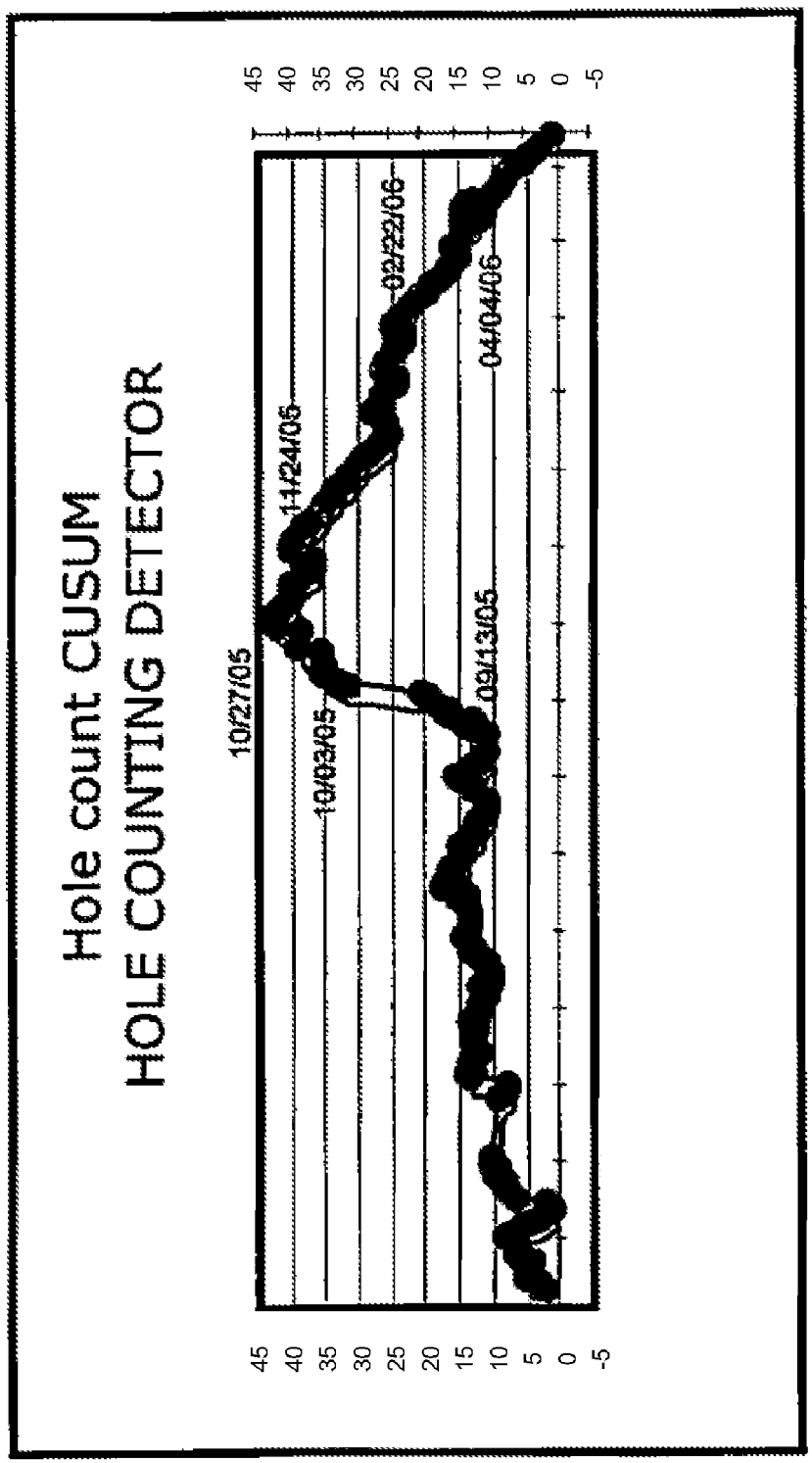
FIG. 8 is an illustration of an implementation of a CUSUM chart.

Referring to FIG. 8, an example of a CUSUM chart of hole counts on a paper machine is illustrated, with potential inflection points illustrated on Sep. 13, 2005, Oct. 27, 2005, and Nov. 24, 2005.

CUSUM charts may be automatically generated for each variable of interest, then each inflection point may be manually or automatically identified and output to a table or database. Once the dates of the inflection points have been determined and/or calculated for each variable of interest, variables that may have influenced or caused a shift in a particular variable at a particular inflection point for that particular variable can be identified in at least two ways. The first is to prepare a table of process variables listing each variable's inflection points and then compare the dates to see which variables had the same or correlating inflection point dates. The second is to prepare a set of CUSUM charts where in each CUSUM chart, a line is plotted for the variable of interest and another line is plotted for one of the other process variables (often represented as a "tag"). In this way, an overlay CUSUM chart is formed for each process variable or tag that could affect the variable of interest. By visual inspection or automated analysis, variables or tags exhibiting similarly timed inflection points as the variable of interest can be identified and potential causes of the process shift corresponding with the movement of the corresponding variables investigated.

Figure 9A:
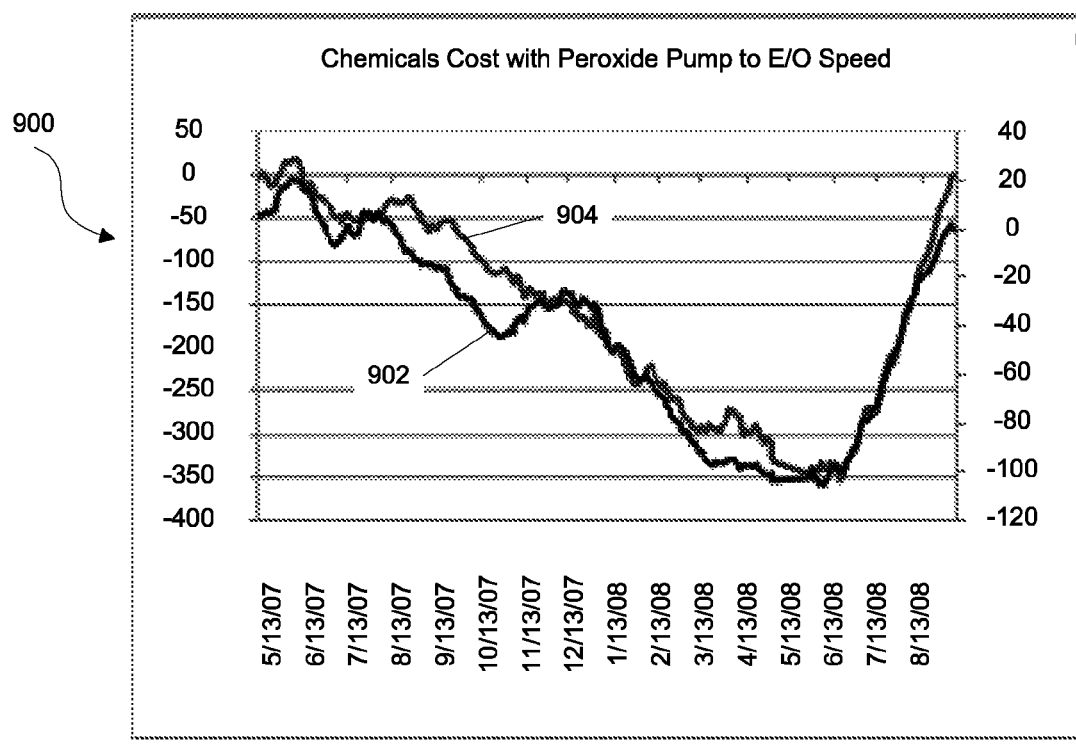
FIG. 9A is an illustration of an implementation of a overlay CUSUM chart.

Referring to FIG. 9A, an implementation of an overlay CUSUM chart 900 is illustrated. As illustrated, if the process variable Chemicals Cost 902 were the variable of interest, it appears from the overlaid line for the Peroxide Pump to E/O Speed 904 that an inflection point for both variables occurred around Jun. 13, 2008 and that the variables probably have a positive correlation (i.e., they will track each other).

In other implementations of data analysis systems, exponentially weighted moving average charts (EWMA) charts may be utilized in an analogous sense to identify inflection points in variables. Like the CUSUM chart, point on an EWMA chart is related to the previously plotted points, except that for EWMA charts, the current chart point is multiplied by a weight between 0 and 1 then added to the value of the prior plotted point multiplied by one minus the weight. While the statistical performance of an EWMA chart is approximately equivalent to that of an CUSUM, it may be easier to read and implement in practice, because the values on an EWMA plot are actual values of the variable of interest, rather than positive and negative deviations from a target value. While this is an advantage during implementation, particular implementations of data analysis systems employing EWMA charts to identify inflection points and variables affecting a particular variable of interest by overlaying EWMA charts may employ axis scaling to ensure that differences in unit sizes do not interfere with the ability of the user or system to identify potentially correlating variables. In other implementations, axis scaling may not be used. Relevant teachings regarding the structure, use, and function of EWMA charts may also be found in Chapter 8 of the text by Montgomery entitled *Introduction to Statistical Quality Control*, 4th Edition, Chap. 8 (John Wiley and Sons, 2001), which was previously incorporated by reference.

Any of a wide variety of other chart types and/or methods of identifying the date a particular variable shifted may be utilized in particular implementations of data analysis systems and related methods, including, by non-limiting example, autocorrelation techniques, engineering process control methods, and any other method or system capable of capturing a process shift.

Figure 9B:
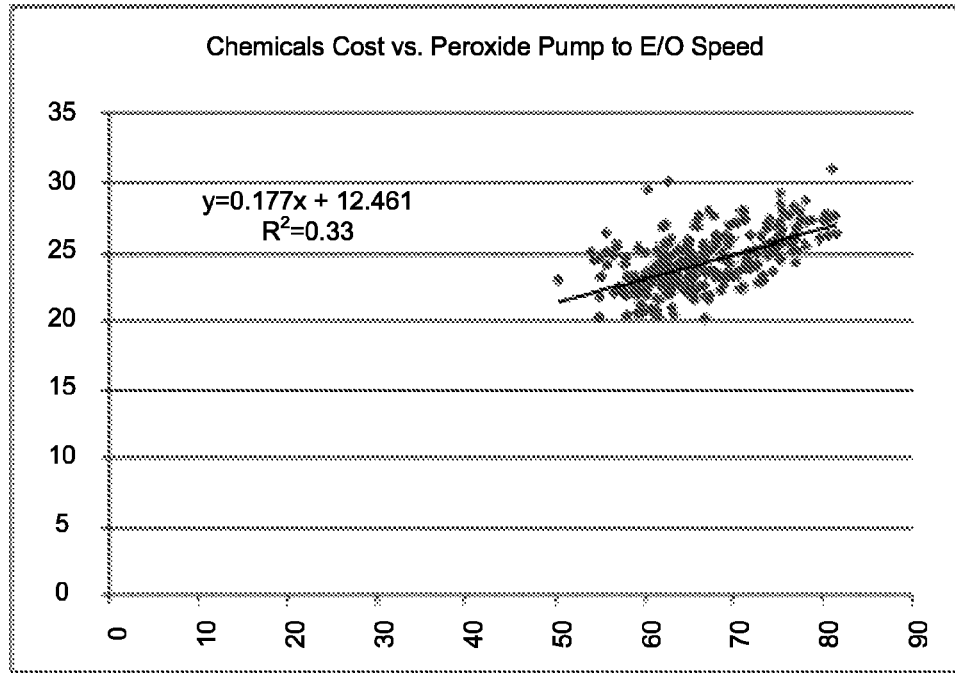
FIG. 9B is an illustration of an implementation of a correlation plot.

Once an inflection point has been identified on a CUSUM or EWMA chart for a particular variable of interest (which may be referred to as a dependent variable), the table and/or chart overlay approaches previously discussed may be utilized to identify any other process variable (which may be referred to as an independent variable and/or be represented by a "tag") that be a cause of the observed shift. For each variable identified, particular implementations of data analysis systems and related methods may construct a correlation plot to graphically and/or mathematically determine the degree of correlation of the variables. A wide variety of correlation plots and/or methods of determining the correlation between two variables may be used, including, by non-limiting example, X-Y scatterplots, linear regression, $R^2$ values, adjusted $R^2$ values, regression models, residuals, probability plots, single-sided probability plots with F statistics, confidence intervals, cross-correlations, Fourier transforms, or any other system and/or method for evaluating the interrelationship of two variables. Referring to FIG. 9A, the illustrated implementation of an overlay CUSUM chart for Chemicals Cost versus Peroxide Pump to E/O Speed indicates a strong correlation between variation of the Peroxide Pump variable with the Cost variable. To confirm that a relationship exists, or to independently determined whether a relationship exists, an implementation of a correlation plot, in this case, an X-Y scatterplot with an $R^2$ value may be constructed for the data in the CUSUM plot and is illustrated in FIG. 9B. From inspection, a positive correlation exists (as evidenced by the slope of the fit line). The relatively low $R^2$ value (0.33) observed may be the result of attempting to fit a single line to the large number of data points included in the plot. In other implementations, any method or algorithm for selecting only a portion of the data points for inclusion in the plot may be employed to permit calculation lines with larger $R^2$ values.

In implementations of data analysis systems employing inflection point analysis coupled with confirmation with correlation plots, a wide variety of potential manual or automatic approaches to the analysis may be utilized. For example, one or more dates may be input into the system and all process variables or tags with CUSUM charts corresponding with that date may be displayed and analyzed using a corresponding correlation plot. In other implementations, a desired $R^2$ value may be input, indicating a desired degree of correlation between an identified variable and the variable of interest that share a corresponding inflection point. In such an implementation, overlaid CUSUM or EWMA plots may only be displayed for the variables with the desired degree of correlation.

Figure 10:
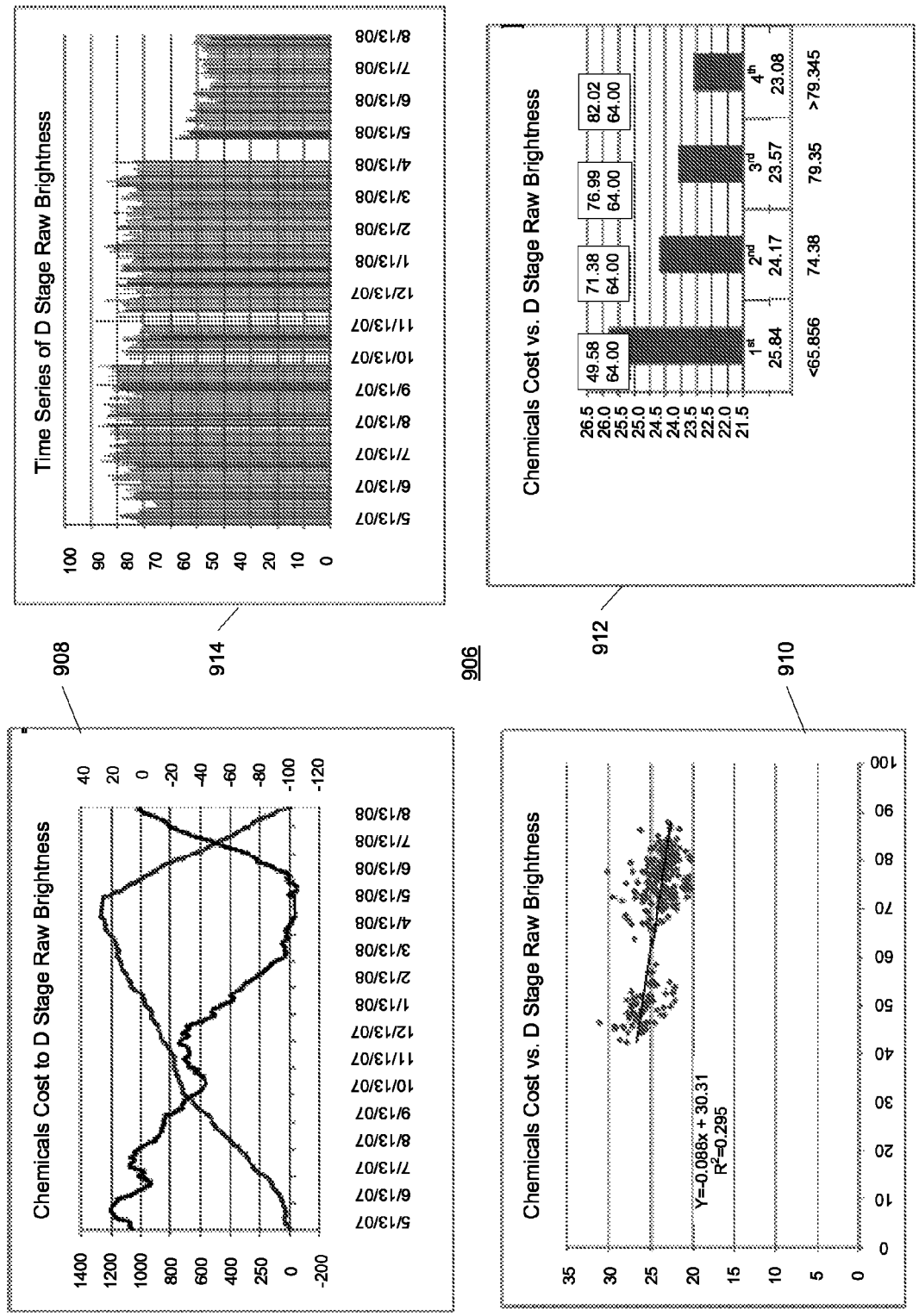
FIG. 10 is an illustration of an implementation of an output display.

In particular implementations of the system a number of various plots may be utilized in combination with each other and/or displayed in a common interface or output display to permit easy review of each process variable that may influence a variable of interest. Referring to FIG. 10, an implementation of such an output display 906 is illustrated. As illustrated, the output display 906 may include a CUSUM overlay plot 908, an X-Y plot with a regression line plotted and $R^2$ value 910, a quartile plot 912, and a time series trend 914 for the process variable or tag being displayed. A wide variety of potential orientations, methods of accessing, displaying, constructing, or arranging the various charts, graphs, plots, and other information on implementations of an output display 906 are possible.

Figure 11:
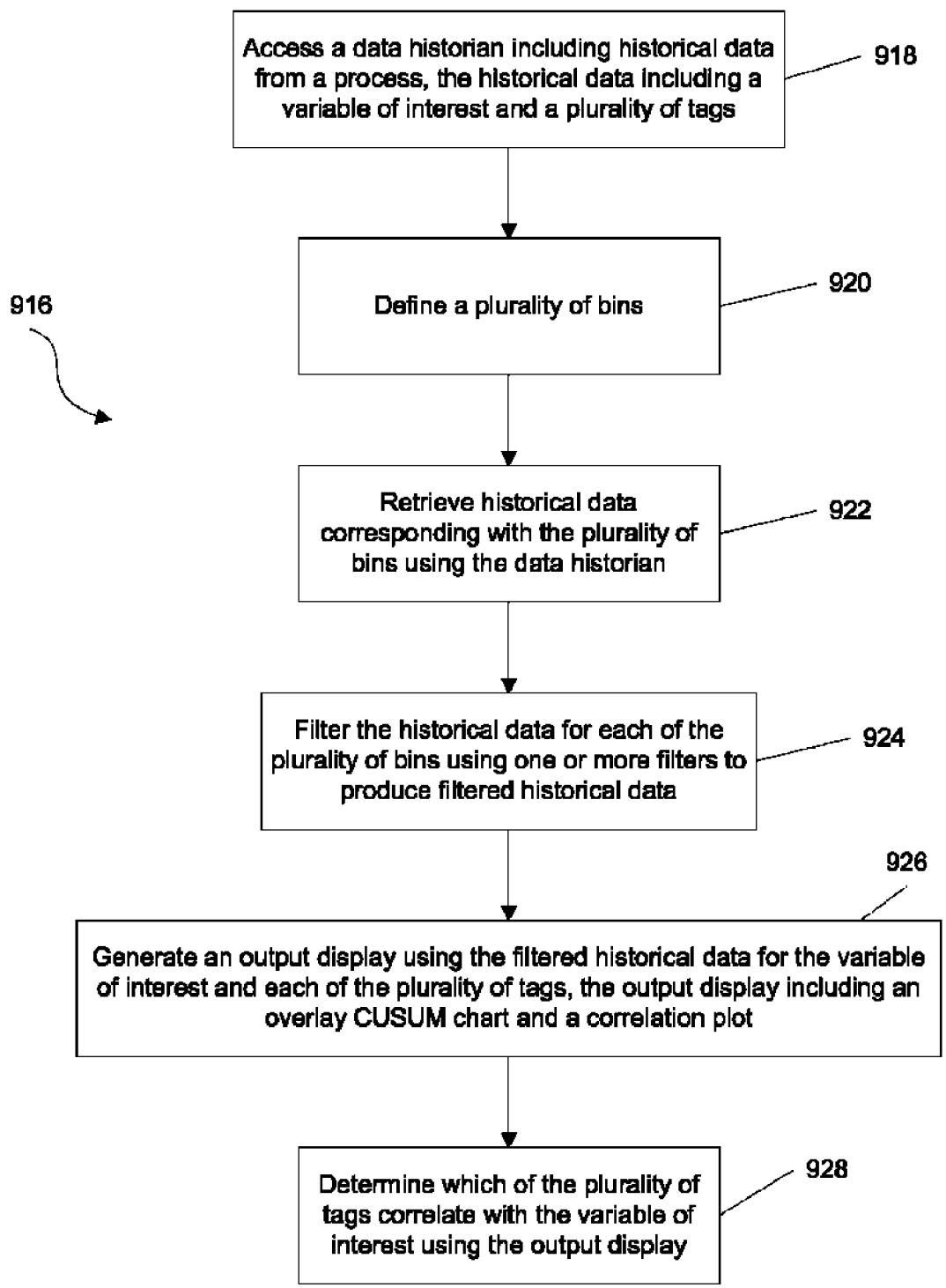
FIG. 11 is a flow chart of a first implementation of a method of determining a relationship between a variable of interest and one or more process variables represented by a corresponding plurality of tags.

Referring to FIG. 11, an implementation of a method of determining a relationship between a variable of interest and one or more process variables represented by a corresponding plurality of tags 916 is illustrated. As illustrated, the method 916 may include accessing a data historian including historical data from a process, the historical data including a variable of interest and a plurality of tags (step 918). The method 916 may also include defining a plurality of bins (step 920), retrieving historical data corresponding with the plurality of bins using the data historian (step 922), and filtering the historical data for each of the plurality of bins using one or more filters to produce filtered historical data (step 924). Filtering may be accomplished by any of the methods disclosed or incorporated by reference in this document. The method 916 may also include generating an output display using the filtered historical data for the variable of interest and each of the plurality of tags (step 926) and determining which of the plurality of tags correlate with the variable of interest using the output display (step 928). The output display may include an overlay CUSUM chart and a correlation plot. The data historian, bins, tags, CUSUM charts, and correlation plots used in implementations of the method 916 may be any disclosed in this document or in other documents incorporated by reference.

Figure 12:
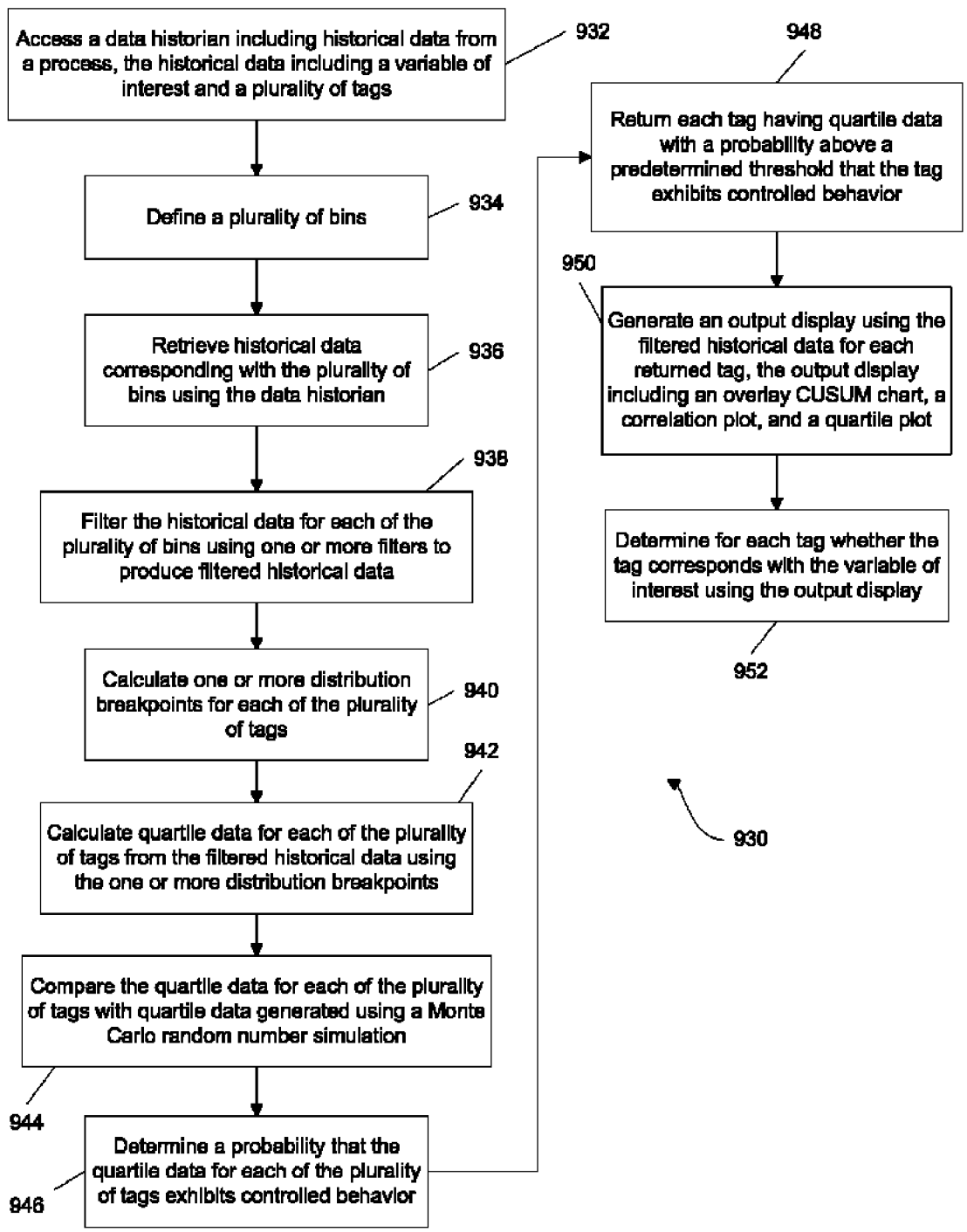
FIG. 12 is a flow chart of a second implementation of a method of determining a relationship between a variable of interest and one or more process variables represented by a corresponding plurality of tags.

Referring to FIG. 12, a second implementation of a method of determining a relationship between a variable of interest and one or more process variables represented by a corresponding plurality of tags 930 is illustrated. As illustrated, the method 930 may include accessing a data historian including historical data from a process, the historical data including a variable of interest and a plurality of tags (step 932). The method 930 may also include defining a plurality of bins (step 934), retrieving historical data corresponding with the plurality of bins using the data historian (step 936), and filtering the historical data for each of the plurality of bins using one or more filters to produce filtered historical data (step 938). Filtering may be accomplished by any of the methods disclosed in this document. The method 930 may further include calculating one or more distribution breakpoints for each of the plurality of tags (step 940) and calculating quartile data for each of the plurality of tags from the filtered historical data using the one or more distribution breakpoints (step 942). Calculating the one or more distribution breakpoints and calculating quartile data using the one or more distribution breakpoints may be accomplished using any of the methods disclosed in this document or in other documents incorporated by reference.

The method 930 may further include comparing the quartile data for each of the plurality of tags with quartile data generated using a Monte Carlo random number simulation (step 944). In implementations of the method 930, any random number based quartile data simulation process could also be used, whether utilizing Monte Carlo methodology or not. The generated quartile data represent the output of a random process, and accordingly can be used with various statistical tests (t tests, F tests, or others) to determine a probability that the quartile data from the plurality of tags comes from a random process or one that is being controlled. Accordingly, the method 930 may include determining a probability that the quartile data for each of the plurality of tags exhibits controlled behavior (step 946) and returning each tag having quartile data with a probability above a predetermined threshold that the tag exhibits controlled behavior (step 948). The predetermined threshold may be a value of a test statistic (z score, t statistic, F statistic, or any other statistical, arbitrary, or calculated value). The method may further include generating an output display using the filtered historical data for each returned tag (step 950) and determining for each tag whether the tag corresponds with the variable of interest using the output display (step 952). The output display may include an overlay CUSUM chart, a correlation plot, and a quartile plot.

Determining whether each tag corresponds with the variable of interest may include automatically or visually comparing the shape of the CUSUM line for each of the plurality of tags with the shape of the CUSUM line for the variable of interest on each of the generated overlay CUSUM charts, comparing one or more inflection points for the CUSUM line for the variable of interest stored in a table with one or more inflection points for the CUSUM line of each of the plurality of tags stored in a table, comparing an $R^2$ value on the correlation plot with a predetermined threshold, or using a correlation statistic on the correlation plot. Any of a wide variety of other methods of determining the correlation between the two variables using the generated plots and/or calculated statistics or data may be utilized in particular implementations.

Figure 13:
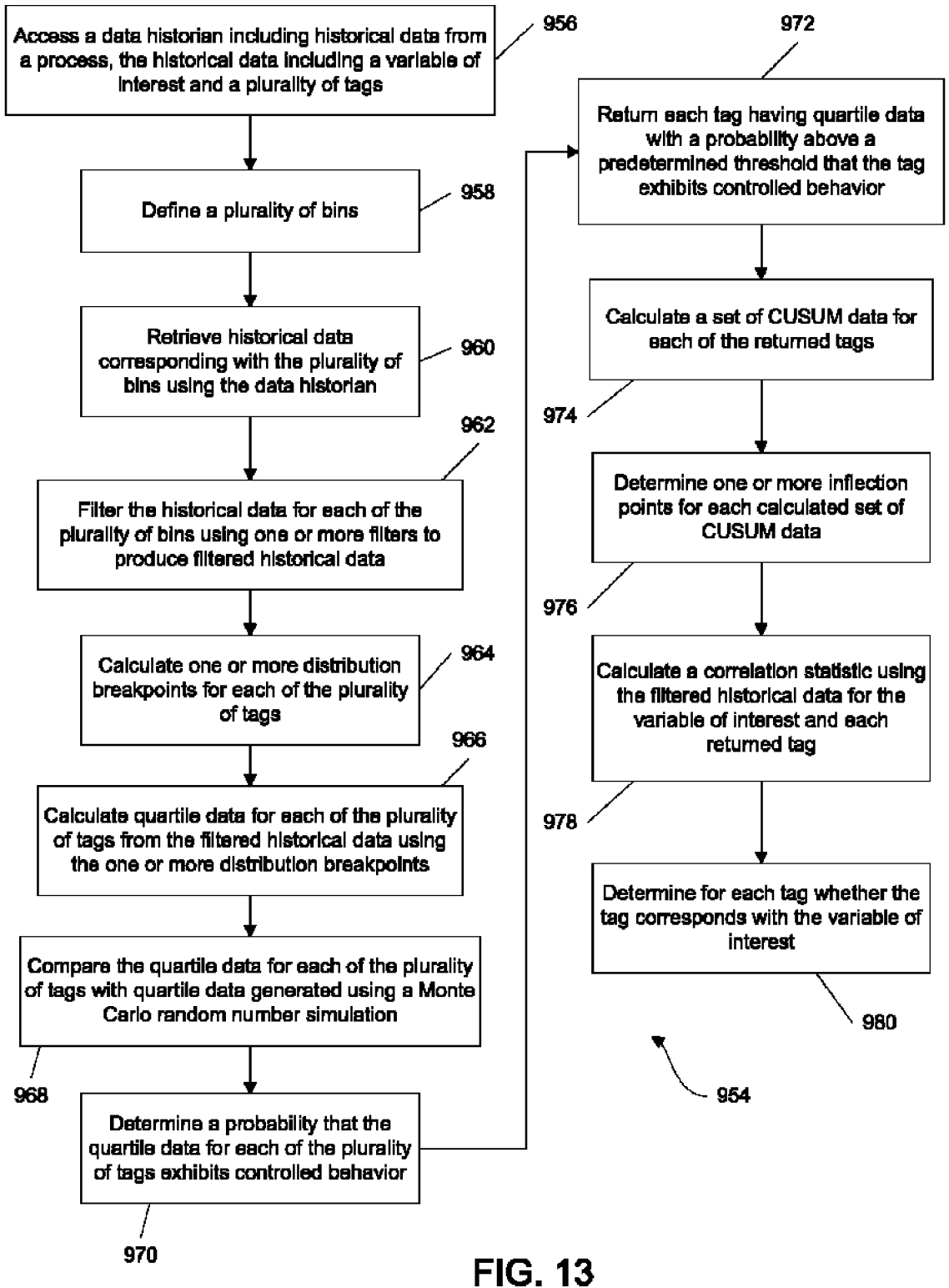
FIG. 13 is a flow chart of a third implementation of a method of determining a relationship between a variable of interest and one or more process variables represented by a corresponding plurality of tags.

Referring to FIG. 13, a third implementation of a method of determining a relationship between a variable of interest and one or more process variables represented by a corresponding plurality of tags 954 is illustrated. As illustrated, the method 954 may include accessing a data historian including historical data from a process, the historical data including a variable of interest and a plurality of tags (step 956). The method 954 may also include defining a plurality of bins (step 958), retrieving historical data corresponding with the plurality of bins using the data historian (step 960), and filtering the historical data for each of the plurality of bins using one or more filters to produce filtered historical data (step 962). Filtering may be accomplished using any of the methods disclosed in this document or in any document incorporated by references. The method 954 may further include calculating one or more distribution breakpoints for each of the plurality of tags (step 964) and calculating quartile data for each of the plurality of tags from the filtered historical data using the one or more distribution breakpoints (step 966). The distribution breakpoints and quartile data may be calculated as discussed previously.

The method 954 may further include comparing the quartile data for each of the plurality of tags with quartile data generated using a Monte Carlo random number simulation (step 968), determining a probability that the quartile data for each of the plurality of tags exhibits controlled behavior (step 970), and returning each tag having quartile data with a probability above a predetermined threshold that the tag exhibits controlled behavior (step 972). The various options available in addition to Monte Carlo simulations that may be utilized in particular implementations, along with the particular thresholds that may be utilized may be those discussed previously. The method 954 may also include calculating a set of CUSUM data for each of the returned tags (step 974). In this step, the CUSUM data may be merely stored in a table or database for analysis, but not actually plotted on a graph. The method 954 may also include determining one or more inflection points for each calculated set of CUSUM data (step 976), calculating a correlation statistic using the filtered historical data for the variable of interest and each returned tag (step 978), and determining for each tag whether the tag corresponds with the variable of interest (step 980). All of the foregoing may be accomplished analytically without reference to a graph of any kind in particular implementations using the calculated data sets themselves rather than visual plots. The decision of whether the tag corresponds with a variable of interest may also be done analytically in particular implementations of the method 954 without reference to graphs. The correlation statistic calculated in particular implementations may be any disclosed in this document or incorporated by reference associated with a correlation plot or other method of determining the correlation between two variables.

It will be understood that implementations are not limited to the specific components disclosed herein, as virtually any components consistent with the intended operation of a method and/or system implementation for a data analysis system may be utilized. Accordingly, for example, although particular computers, servers, routers, keyboards, mice, network interfaces, screens, bar plots, and network components may be disclosed, such components may comprise any shape, size, style, type, model, version, class, grade, measurement, concentration, material, weight, quantity, and/or the like consistent with the intended operation of a method and/or system implementation for a data analysis system may be used.

In places where the description above refers to particular implementations of data analysis systems and related methods, it should be readily apparent that a number of modifications may be made without departing from the spirit thereof and that these implementations may be applied to other data analysis systems and other related methods.

The invention claimed is:

1. A method of determining a relationship between a variable of interest and one or more process variables represented by a corresponding plurality of tags, the method comprising:
   accessing, by a computer, a data historian comprising historical data from a process, the historical data comprising a variable of interest and a plurality of tags;
   defining, by the computer, a plurality of bins;
   retrieving, by the computer, historical data corresponding with the plurality of bins using the data historian;
   filtering, by the computer, the historical data for each of the plurality of bins using one or more filters to produce filtered historical data;
   generating, by the computer, an output display using the filtered historical data for the variable of interest and each of the plurality of tags, the output display comprising:
   an overlay CUSUM chart and;
   a correlation plot; and
   determining, by the computer, which of the plurality of tags correlate with the variable of interest using the output display.

2. The method of claim 1, wherein filtering the historical data for each of the plurality of bins further comprises using one or more filters for values of the variable of interest that utilize one of duration, frequency, value, date, vendor, and trial to select historical data from each of the plurality of bins.

3. The method of claim 1, wherein determining which of the plurality of tags correlate with the variable of interest using the output display further comprises:
   comparing a shape of a CUSUM line for each of the plurality of tags with a shape of a CUSUM line for the variable of interest on each overlay CUSUM chart and determining a correlation.

4. The method of claim 1, wherein determining which of the plurality of tags correlate with the variable of interest using the output display further comprises:
   comparing one or more inflection points for the CUSUM line for the variable of interest stored in a table with one or more inflection points for the CUSUM line of each of the plurality of tags stored in a table and determining a correlation.

5. The method of claim 1, wherein determining which of the plurality of tags correlate with the variable of interest using the output display further comprises:
   comparing an $R^2$ value on the correlation plot with a predetermined threshold and determining a correlation.

6. The method of claim 1, wherein determining which of the plurality of tags correlate with the variable of interest using the output display further comprises:
   determining a correlation using a correlation statistic on the correlation plot.

7. The method of claim 1, further comprising determining one or more inflection points for the overlay CUSUM chart.

8. A method of determining a relationship between a variable of interest and one or more process variables represented by a corresponding plurality of tags, the method comprising:
   accessing, by a computer, a data historian comprising historical data from a process, the historical data comprising a variable of interest and a plurality of tags;
   defining, by the computer, a plurality of bins;
   retrieving, by the computer, historical data corresponding with the plurality of bins using the data historian;
   filtering, by the computer, the historical data for each of the plurality of bins using one or more filters to produce filtered historical data;
   calculating, by the computer, one or more distribution breakpoints for each of the plurality of tags;
   calculating, by the computer, quartile data for each of the plurality of tags from the filtered historical data using the one or more distribution breakpoints;
   comparing, by the computer, the quartile data for each of the plurality of tags with quartile data generated using a Monte Carlo random number simulation;
   determining, by the computer, a probability that the quartile data for each of the plurality of tags exhibits controlled behavior;
   returning, by the computer, each tag having quartile data with a probability above a predetermined threshold that the tag exhibits controlled behavior;
   generating, by the computer, an output display using the filtered historical data for each returned tag, the output display comprising:
   an overlay CUSUM chart;
   a correlation plot; and
   a quartile plot; and
   determining, by the computer, for each tag whether the tag corresponds with the variable of interest using the output display.

9. The method of claim 8, wherein filtering the historical data for each of the plurality of bins further comprises using one or more filters for values of the variable of interest that utilize one of duration, frequency, value, date, vendor, and trial to select historical data from each of the plurality of bins.

10. The method of claim 8, wherein determining for each tag whether the tag corresponds with the variable of interest using the output display further comprises:
    comparing a shape of a CUSUM line for each of the plurality of tags with a shape of a CUSUM line for the variable of interest on each overlay CUSUM chart and determining a correlation.

11. The method of claim 8, wherein determining for each tag whether the tag corresponds with the variable of interest using the output display further comprises:
    comparing one or more inflection points for the CUSUM line for the variable of interest stored in a table with one or more inflection points for the CUSUM line of each of the plurality of tags stored in a table and determining a correlation.

12. The method of claim 8, wherein determining for each tag whether the tag corresponds with the variable of interest using the output display further comprises:
comparing an $R^2$ value on the correlation plot with a predetermined threshold and determining a correlation.

13. The method of claim 8, wherein determining for each tag whether the tag corresponds with the variable of interest using the output display further comprises:
determining a correlation using a correlation statistic on the correlation plot.

14. The method of claim 8, further comprising determining one or more inflection points for the overlay CUSUM chart.

15. A method of determining a relationship between a variable of interest and one or more process variables represented by a corresponding plurality of tags, the method comprising:
accessing, by a computer, a data historian comprising historical data from a process, the historical data comprising a variable of interest and a plurality of tags;
defining, by the computer, a plurality of bins;
retrieving, by the computer, historical data corresponding with the plurality of bins using the data historian;
filtering, by the computer, the historical data for each of the plurality of bins using one or more filters to produce filtered historical data;
calculating, by the computer, one or more distribution breakpoints for each of the plurality of tags;
calculating, by the computer, quartile data for each of the plurality of tags from the filtered historical data using the one or more distribution breakpoints;
comparing, by the computer, the quartile data for each of the plurality of tags with quartile data generated using a Monte Carlo random number simulation;
determining, by the computer, a probability that the quartile data for each of the plurality of tags exhibits controlled behavior;
returning, by the computer, each tag having quartile data with a probability above a predetermined threshold that the tag exhibits controlled behavior;
calculating, by the computer, a set of CUSUM data for each of the returned tags;
determining, by the computer, one or more inflection points for each calculated set of CUSUM data;
calculating, by the computer, a correlation statistic using the filtered historical data for the variable of interest and each returned tag; and
determining, by the computer, for each tag whether the tag corresponds with the variable of interest.

16. The method of claim 15, wherein filtering the historical data for each of the plurality of bins further comprises using one or more filters for values of the variable of interest that utilize one of duration, frequency, value, date, vendor, and trial to select historical data from each of the plurality of bins.

17. The method of claim 15, wherein determining for each tag whether the tag corresponds with the variable of interest further comprises:
comparing the set of CUSUM data for each of the plurality of tags with the set of CUSUM data for the variable of interest and determining a correlation.

18. The method of claim 15, wherein determining for each tag whether the tag corresponds with the variable of interest further comprises:
comparing one or more inflection points for the set of CUSUM data for the variable of interest with one or more inflection points for the set of CUSUM data for each of the plurality of tags and determining a correlation.

19. The method of claim 15, wherein determining for each tag whether the tag corresponds with the variable of interest further comprises:
comparing an $R^2$ value with a predetermined threshold and determining a correlation.

20. The method of claim 15, wherein determining for each tag whether the tag corresponds with the variable of interest further comprises:
determining a correlation using the calculated correlation statistic.

* * * * *